No. 668,108. Patented Feb. 12, 1901.
C. O. MAILLOUX.
TRANSFER APPARATUS FOR ELECTRIC BATTERIES.
(Application filed Dec. 29, 1899.)
(No Model.) 6 Sheets—Sheet 1.

Witnesses:
J. B. McGirr
H. S. Brown

Inventor:
Cyprien O. Mailloux
By
J. H. Townsend
Attorney

No. 668,108. Patented Feb. 12, 1901.
C. O. MAILLOUX.
TRANSFER APPARATUS FOR ELECTRIC BATTERIES.
(Application filed Dec. 29, 1899.)
(No Model.) 6 Sheets—Sheet 2.

Witnesses:

Inventor,
Cyprien O. Mailloux
By
Attorney

No. 668,108. Patented Feb. 12, 1901.
C. O. MAILLOUX.
TRANSFER APPARATUS FOR ELECTRIC BATTERIES.
(Application filed Dec. 29, 1899.)
(No Model.) 6 Sheets—Sheet 3.

Fig. 4.

Witnesses:
J. B. McGirr
H. S. Brown

Inventor:
Cyprien O. Mailloux
By H. L. Townsend
Attorney

No. 668,108. Patented Feb. 12, 1901.
C. O. MAILLOUX.
TRANSFER APPARATUS FOR ELECTRIC BATTERIES.
(Application filed Dec. 29, 1899.)
(No Model.) 6 Sheets—Sheet 4.

Witnesses:
J. B. McGirr.
H. S. Brown

Inventor.
Cyprien O. Mailloux
By
J. L. Townsend
Attorney

No. 668,108. Patented Feb. 12, 1901.
C. O. MAILLOUX.
TRANSFER APPARATUS FOR ELECTRIC BATTERIES.
(Application filed Dec. 29, 1899.)
(No Model.) 6 Sheets—Sheet 5.

Witnesses:

Inventor:
Cyprien O. Mailloux
By
Attorney

UNITED STATES PATENT OFFICE.

CYPRIEN O. MAILLOUX, OF NEW YORK, N. Y.

TRANSFER APPARATUS FOR ELECTRIC BATTERIES.

SPECIFICATION forming part of Letters Patent No. 668,108, dated February 12, 1901.

Application filed December 29, 1899. Serial No. 741,972. (No model.)

*To all whom it may concern:*

Be it known that I, CYPRIEN O. MAILLOUX, a citizen of the United States, and a resident of New York city, in the county of New York and State of New York, have invented certain new and useful Transfer Apparatus for Electric Batteries, of which the following is a specification.

This invention relates to apparatus for transferring electric batteries from one place to another, and particularly to the transfer of storage batteries to and from street-cars or other vehicles which are to be driven by electricity.

The object of the invention is the production of apparatus by which such transfer may be made easily and quickly and whereby one or more batteries or sets of exhausted cells may be removed from a vehicle and immediately replaced by other batteries or cells.

To this end the invention consists in the construction and combination of parts and devices, as hereinafter fully described, and set forth in the claims.

In the accompanying drawings, which form a part of this specification, Fig. 12 is a detail view showing in perspective a portion of the drawbridge seen in Figs. 10 and 11.

Figure 16:
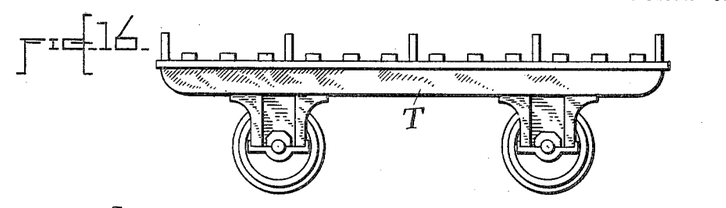
Figs. 16 to 19 show modifications of parts of the apparatus.
Figures 17, 19:
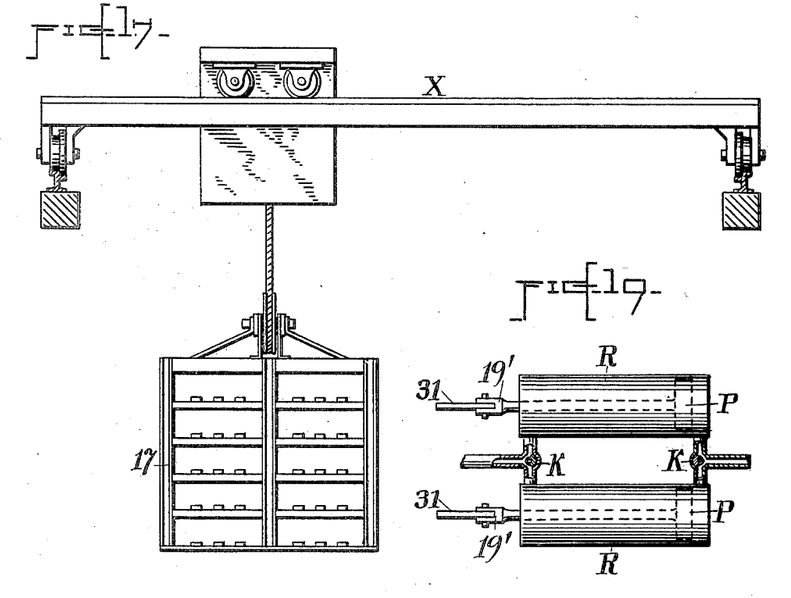

The transfer apparatus will be described in its application to the shifting of batteries to and from a street-railway car, though obviously it may be used in connection with other kinds of vehicles that are to be driven by electric power and which are therefore provided with space for the accommodation of electric batteries of any kind, either primary or secondary. A vehicle provided with the battery-space is represented at 16. It is shown on a trestle over a pit in a battery-charging station, and at the sides of the pit are represented elevator wells or shafts, in which are located elevator cages or cars, as 17, serving as battery carriers or conveyers. These cars are preferably provided with a series of shelves, each of which is adapted to carry one or more sets of batteries or of battery-trays. These elevator-cars or battery-carriers may be shifted with respect to the vehicle by being raised or lowered, so as to bring successively any and all of its shelves on a line with the battery-space in the vehicle. While these battery-carriers have been shown in the form of elevator-cars movable vertically, it is obvious that they may take the form of tram-cars or conveyers T, as seen in Fig. 16, movable horizontally upon tramways in the lengthwise direction of the elevator-car. In such a case each of the shelves of the elevator-car would take the form of and would correspond to one of the tram-cars or conveyers or to a horizontal section thereof. It is also obvious that the battery-carrier instead of being lifted by an elevator-operating mechanism may be handled by a traveling-crane outfit X, Fig. 17, whereby it may not only be raised or lowered, but also translated in longitudinal or lateral direction, or both, and thus be conveyed to any point desired in the station. These modified forms of battery-carriers would be useful and might be preferable where the amount of ground-space in the battery-charging station is ample and sufficient to permit the electric-charging department to be located on the ground floor. When ground-floor space is limited and is expensive, as is the case in large cities, it is preferable to use battery-carriers of the elevator type, as shown in the drawings, and to have the electric-charging department located on the floor or floors above that occupied by the vehicle. In the present instance the motors for the elevator-cars are shown on the second floor at 18.

Figure 4:
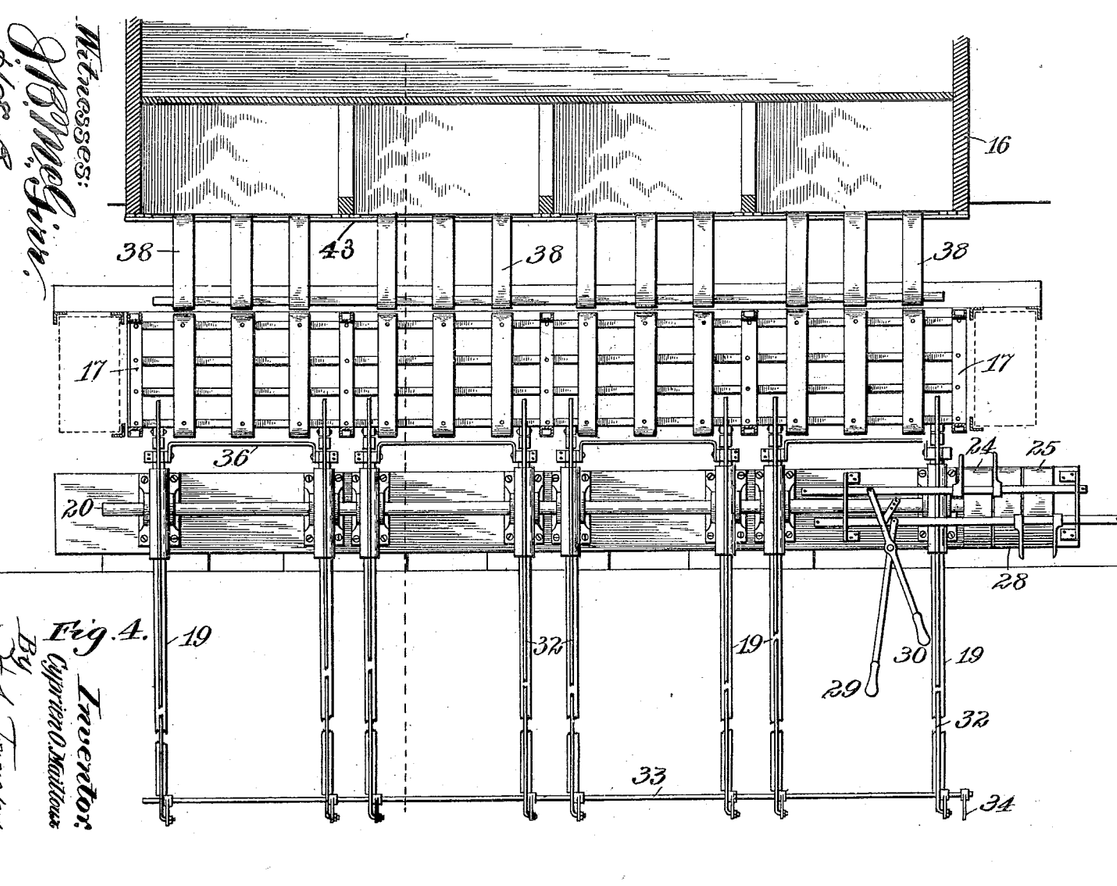
Fig. 4 is a plan of the transfer apparatus shown in connection with a section of the vehicle to which batteries are to be transferred, together with a horizontal section of the battery-carrier. This view is taken in the plane indicated by the dotted line 4 4 in Fig. 1.

One of the principal features of the invention is the application of a power-driven mechanism to the insertion or withdrawal of the batteries or trays of batteries from the vehicle, and one form of transfer apparatus for this purpose consists of one or more reciprocating rods or draw-bars, here shown as rack-bars 19. The exact number and the precise arrangement of the reciprocating bars depends upon the size of the space available for batteries in the vehicle and on the number and size of desired battery-trays to be shifted to and from the said space. In the arrangement shown in the drawings the whole battery-space on each side of the vehicle is subdivided into four compartments each holding one battery-tray, and there are two draw-bars for each tray so located and spaced apart that when the vehicle is brought into the proper position relatively to the elevator-car the draw-bars will correspond to and will be in approximate alinement with the ends of the battery-trays. Each draw-bar is held in place by a special support, of metal, as seen in section in Fig. 3, through which it can be slid back and forth in a straight line like the piston-rod of a steam-engine, the motion being limited in both directions by stop-pins or by other like means. These bars are located at the side of the elevator-wells and are preferably power-driven. For this purpose a horizontal shaft, as 20, is located along the side of the elevator-well and passes through all the rack-bar supports. It is provided with a pinion 21 for each rack-bar. Power may be applied to the shaft 20 in any suitable way. In the present instance it is shown as driven by belts 22 and 23, which normally rest on idle pulleys 24 and 25 and receive their motion from a shaft, as 26, which is driven by means of a belt, as 27, leading to the source of power. One of the belts, as 23, is crossed upon itself, so as to drive the shaft 20 in a direction reverse to that imparted to it by the belt 22. There is upon the shaft 20 a fixed pulley, as 28, located between the two idle pulleys. To this fixed pulley either of the belts may be transferred by means of suitable shifters, as seen in Fig. 4. These shifters are operable by means of the levers 29 and 30. By the manipulation of these levers the rack-bars 19 are made to move in either direction at will.

Figures 2, 3:
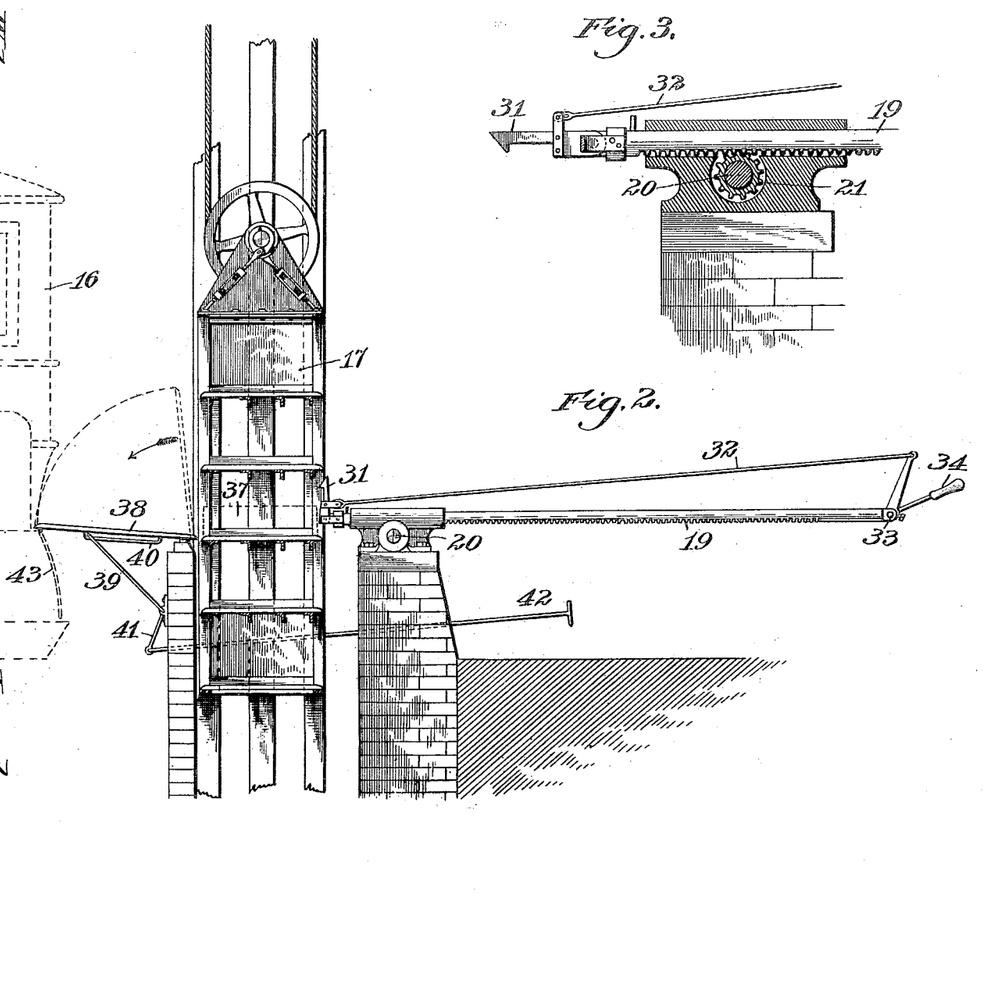
Fig. 2 represents a portion of the transfer apparatus in side elevation with the battery-carrier in vertical section and a portion of the vehicle in dotted lines.
Fig. 3 is a detail, partly in section, of a portion of the transfer apparatus.
Figure 18:
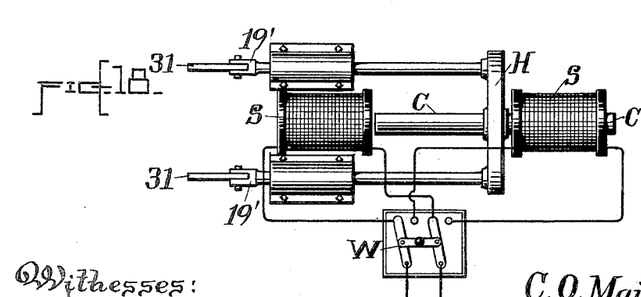

I regard the rack-and-pinion method herein shown for moving the draw-bars as the preferable one for a case such as that shown, where the number of draw-bars to be simultaneously moved is relatively larger. In cases where only one single battery-tray is to be operated and where only one draw-bar, or at most two draw-bars only, are required to be moved other methods of producing the motion of the draw-bar or draw-bars may be employed advantageously. The draw-bars could, for instance, be operated by electromagnetic suction by means of solenoids, electromagnets, or by other electromagnetic arrangements well known in the art. (See Fig. 18, wherein the draw-bars 19' of two adjacent hooks are connected by a cross-head H, to which are attached cores C of solenoids S.) A switch W may be provided for shifting current through said solenoids alternately to reciprocate the hooks. The draw-bars might also be operated by the force of compressed air or by hydrostatic pressure by being attached to a piston or pistons moving in a suitable cylinder or cylinders subjected to said forces or pressure, (see Fig. 19,) wherein the draw-bars 19' of two adjacent hooks each enter a cylinder R and have thereon a piston P. Cocks, as K, serving alternately as inlet and outlet cocks, may be provided to control the operating fluid in the reciprocation of the hooks. I do not limit myself to any specific method or means for moving the draw-bar or draw-bars. Each of these rack-bars is provided at its inner end with suitable means for engaging the batteries or trays of batteries to be transferred. This means is shown in the present instance as consisting of a hook 31, which is articulated to its rack-bar. It is preferable to have direct control of the position of this hook, and to that end a rod, as 32, may be connected therewith and to a rock-shaft, as 33, which rock-shaft may be moved to and fro by any suitable means—as, for instance, the handle 34. By the manipulation of this handle the hook may be made to engage or may be disengaged from the battery or battery-tray to be transferred. Said tray is provided with ears or lugs, as 35, with which said hooks may be engaged. The bill of the hook will serve, in engagement with said ears or lugs, to pull the tray out of the vehicle when motion is outward, and the inner shoulder of the hook may be engaged with said ears for pushing the tray into the vehicle when the motion is inward. Obviously one rack-bar with its hook might be arranged so as to serve to transfer a tray. In that instance the hook would be located opposite the center of the tray, and it could engage the upper edge of the tray or with a bail or any other suitable means secured to the front of the tray; but it is preferable to have a pair of rods with their accompanying hooks for each tray, as shown, and to have a buffer or pushing-bar, as 36, connecting each pair of rack-bars corresponding to each tray, as clearly seen in Fig. 4. In pushing a tray into a car this buffer 36 alone may be used, as indicated in Fig. 2, a tray being represented in dotted lines at 37.

Figure 1:
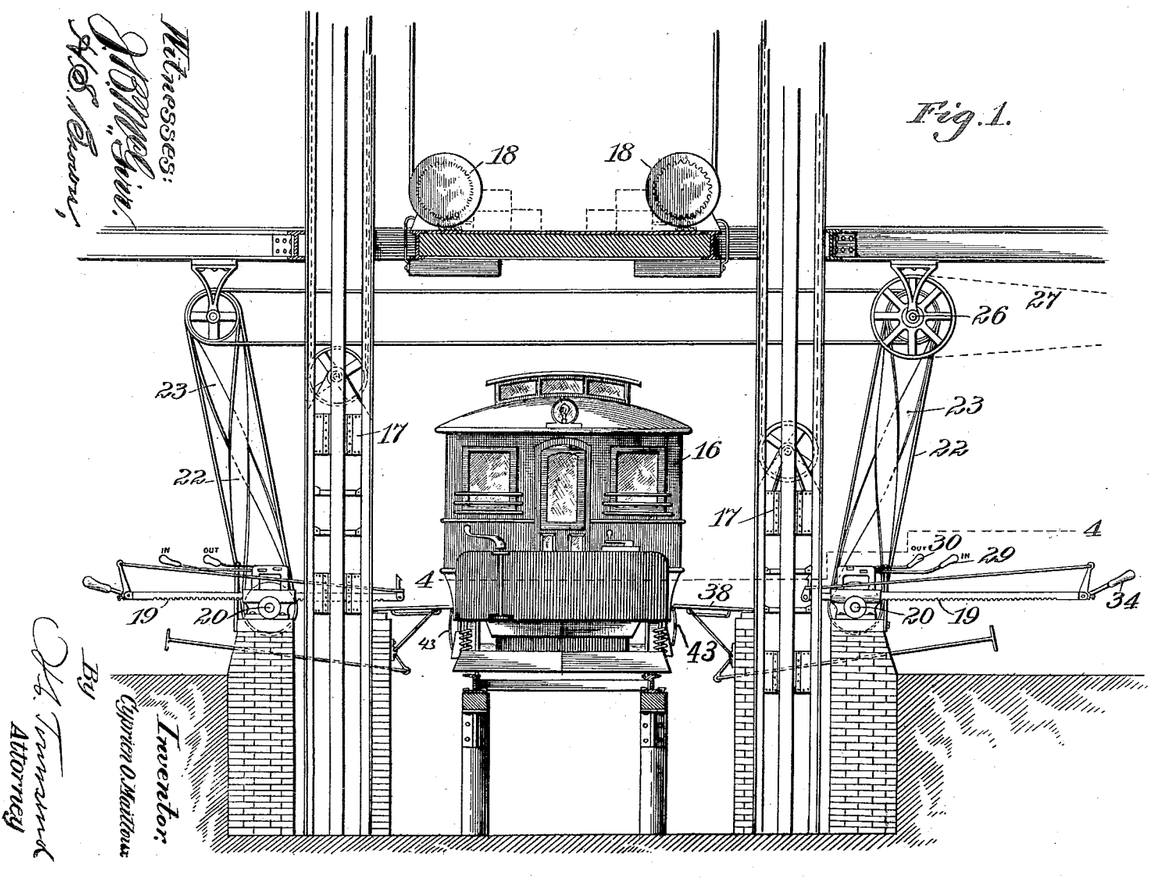
Figure 1 represents the improved apparatus in its location in a battery-charging station.
Figures 8, 9, 10, 11, 13, 14:
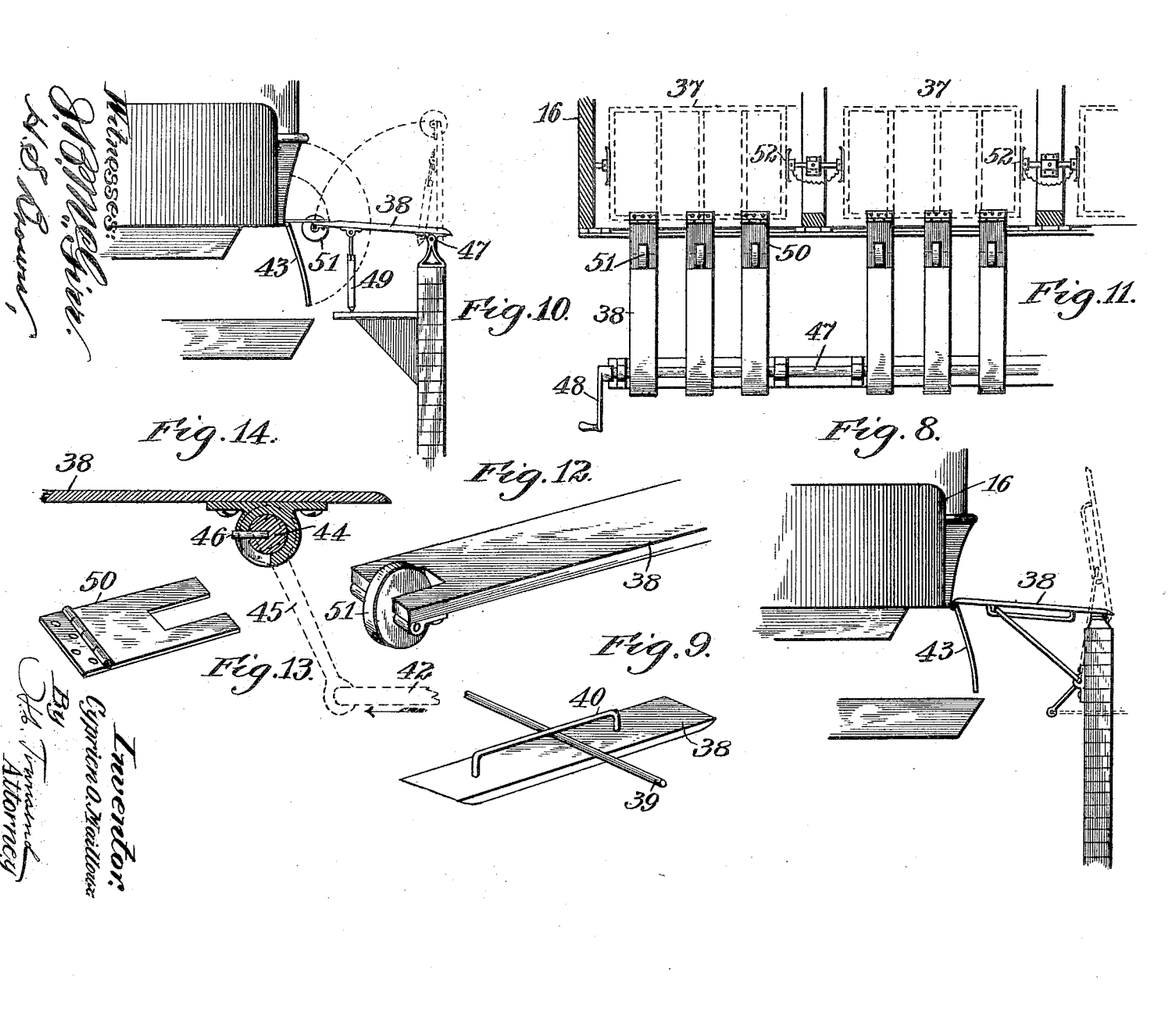
Fig. 8 illustrates in side elevation the preferred form of gang-plank or drawbridge and operating mechanism therefor.
Fig. 9 is a detail of said drawbridge.
Fig. 10 shows in side elevation a modified form of drawbridge.
Fig. 11 is a plan view of this modified form of drawbridge shown in connection with a horizontal section through a portion of a vehicle.
Fig. 13 is a perspective view of a supplementary drawbridge.
Fig. 14 is a longitudinal vertical section of a drawbridge, showing a modification in the operating mechanism thereof.

It is as a rule impracticable to bring the vehicle close enough to the battery-carrier to provide for moving the battery directly into the vehicle. This is especially the case with respect to tramway-cars. For the support of the batteries in transit to the carrier of the vehicle I therefore provide a suitable gangplank or drawbridge. One form of such drawbridge is illustrated at 38. Said bridge is hinged at the side of the elevator-well and is adapted to be swung up out of the way when not in use, as is indicated by the dotted position in Fig. 2. As the battery-space of all vehicles is not of the same elevation and as the elevation changes with the weight when the batteries are pulled in or out, it is well to provide for the drawbridge a certain amount of freedom of movement at its free end. For this purpose a considerable lost motion is provided between said bridge and the operating mechanism therefor. One form of such operating mechanism consists of a rock-shaft provided with an arm, as 39, coöperating with a bail 40 on the drawbridge, and an arm, as 41, to which is pivoted the operating-rod 42. In Figs. 1, 2, and 4 the door of the battery-space in the car is shown in open position at 43, and the drawbridge is shown as resting upon the door-sill or floor of the car. Should a car have its floor at a higher level than that shown, the bridge would obviously adapt itself thereto, because of the freedom of movement between the arm 39 and the bridge. This freedom of movement may be provided for in another manner, as shown in Fig. 14, wherein a shaft, as 44, is journaled to the inner end of the drawbridge and has an arm 45 connecting it to the operating-rod 42. From the shaft 44 a pin, as 46, projects through a slot in the journal box or bearing for the bridge, as shown. By means of the play provided for this pin the outer end of the bridge may come to a stop at different elevations.

Still another form of bridge is illustrated in Figs. 10 and 11. Therein said bridges are connected at their inner end directly to a rock-shaft, as 47, which may be operated by the crank 48. The downward movement of this form of drawbridge is limited by means of the prop 49. In this form it is not intended that the drawbridge shall rest upon the car, and to complete the span between it and the car supplementary drawbridges, as illustrated at 50, are hinged to the car. These when let down lap upon the drawbridges, as indicated in Figs. 10 and 11.

It is well to provide the drawbridge with antifriction-rollers to facilitate the transit of the batteries. Such antifriction means are illustrated in Figs. 11 and 12 and consist of wheels 51, mounted in the ends of the drawbridges, the supplementary drawbridges being preferably notched, so as to span said rollers. These supplementary drawbridges also serve the function of determining the exact alinement of the space in the vehicle with the battery-carriers, since they cannot take operable position except when the car is in position for their slotted ends to span the said antifriction wheels or rollers.

Figures 7, 15:
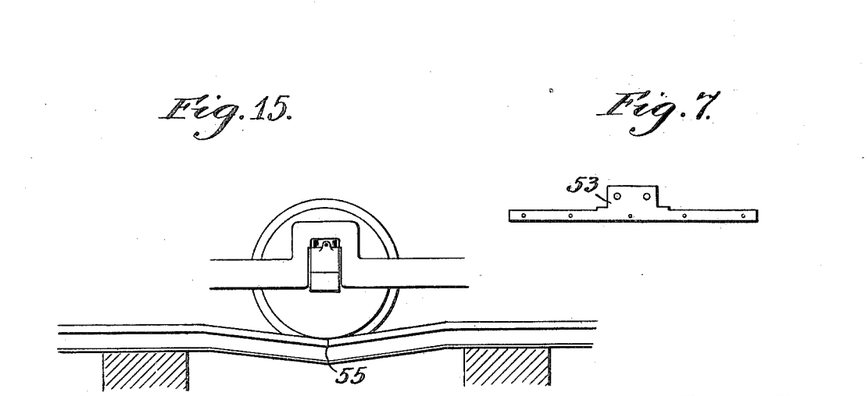
Fig. 7 is a detail of the contact-strip.
Fig. 15 is a detail in side elevation of a part of a car-truck and track-rail formed to bring the car into a definite position for the transfer of batteries.

To automatically effect the alinement of the battery-space of the vehicle with the battery-carrier, drawbridges, &c., various means may be provided for bringing the vehicle to a standstill at the proper point. This may be accomplished, as indicated in Fig. 15, by making slight hollows in the track or roadway of the vehicle, as at 55, at the points where the wheels of the vehicle should be, to provide for properly conducting the transfer of the batteries out of or into the vehicle. When the vehicle is brought near the right position, the action of gravity causes it to move until the wheels are in the lowest part of the hollows 55 in the track or roadway, and the vehicle automatically comes to rest in this position when left to itself.

Figure 5:
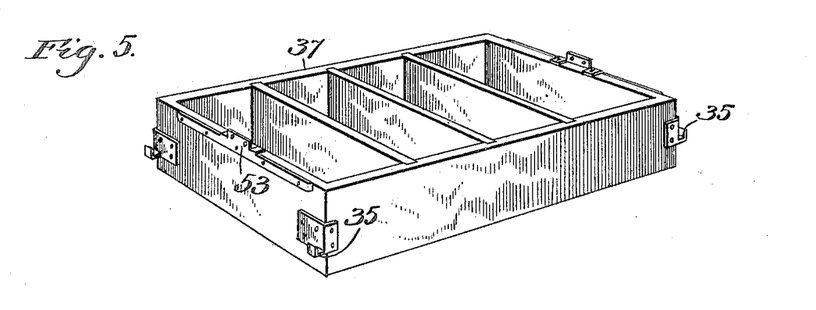
Fig. 5 illustrates in perspective one of the battery-trays.
Figure 6:
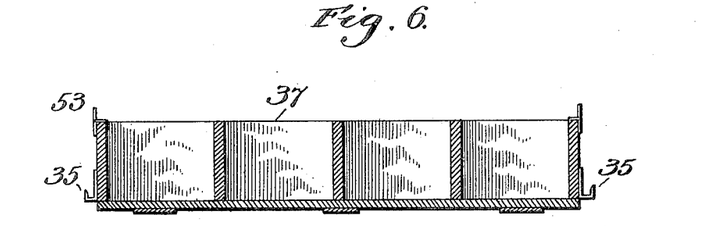
Fig. 6 is a longitudinal vertical section thereof.

In Fig. 11 battery-trays are indicated by dots in their position within the car, contact-plates, as 52, being there shown in position to engage with contact-plates upon the sides of the battery-trays. The contact-plates 53 upon the sides of the trays, Figs. 5, 6, and 7, may be of any suitable form adapting the trays for engagement with the discharge-contacts 52 and with contacts in the charging-room.

In Fig. 4 one side of a street-railway car having four chambers for batteries is illustrated, and the transfer apparatus is illustrated as constructed for withdrawing the batteries from all of these spaces at once and for inserting simultaneously new batteries therein. To provide for this, the elevator-car is shown as occupied in carrying four trays on each shelf. This illustrates the fact that any convenient number of trays may be shifted at one time. Fig. 1 also illustrates the fact that the batteries on both sides of the car may be transferred at once. This is provided for by duplicating upon the left-hand side of the pit the mechanism shown upon the right. It will be noted also that the elevator-car is provided with an odd number of shelves, in this instance five. In practice four of these shelves will be filled with charged batteries, while one of them is left for the reception of the discharged batteries that are to be taken from the vehicle. Thus an elevator-car of the capacity shown when once loaded will serve to supply batteries to four vehicles. The exhausted batteries of each successive vehicle take the place on the shelves of the car of the charged batteries supplied to the preceding vehicles.

The operation of my invention is as follows: The vehicle is brought into the proper position opposite the battery-carrier, and the proper alinement thereof with said battery-carrier is effected either automatically or otherwise. The hinged panels inclosing the battery-compartments of the vehicle are then opened, and by manipulation of the rod 42 the drawbridges are swung into position. This being done, lever 30 may be operated to advance the rack-bars 18, the hooks 31 being thrown down before the advancement thereof, and when engaged with the ears 35 on the trays the lever 30 is reversed and the lever 29 is also moved, causing the rack-bars 19 to recede and to draw with them the trays from the car. When this has been done, the hooks 31 are raised by tilting the handle 34, and the elevator may then be moved up or down the distance of one shelf, as the case may be, and the lever 30 then operated to advance the rack-bars, thereby pushing the fresh batteries into the car. Upon their reaching their destination the lever 30 may be reversed and the lever 29 operated to withdraw the rack-bars. The drawbridge will then be thrown up, the doors 43 closed, and the car is ready to proceed. When all the charged batteries have been removed from the elevator, it will be sent to the charging-room, where the exhausted batteries may be recharged.

The mechanism for transferring the batteries from the elevator-car to the charging-racks and back again to the elevator-car forms the subject of a companion application and is not therefore presented herewith.

The transferring apparatus described may be varied in many of its details and modified in other ways than those herein mentioned without departing from the invention.

I claim as my invention—

1. The combination with a vehicle having space for electric batteries, of transfer apparatus opposite the entrance into said space, a battery-carrier located between the vehicle and the transfer apparatus, and a reciprocating rod forming a part of said apparatus and adapted to push a battery from the carrier into the vehicle and to pull a battery from the vehicle onto the carrier.

2. In a power-driven transfer apparatus for batteries, a reciprocating bar or rod provided with an articulated hook at its outer end for engaging a battery-cell or tray of batteries and means for engaging or disengaging said hook therefrom.

3. The combination with a battery cell or tray provided with lugs or ears of reciprocating rods provided with hooks for engaging said ears and moving the tray, and means for disengaging said hooks at will.

4. In a transfer apparatus for batteries, the combination with two or more rack-bars, of a shaft provided with pinions for reciprocating said rack-bars, and means upon said rack-bars for engaging and disengaging battery-trays for the purpose set forth.

5. In a transfer apparatus for batteries, the combination with an elevator-car, of a rotary shaft located alongside the elevator-well and provided with a series of pinions, a series of rack-bars arranged transversely of said shaft and engaging said pinions, and means for reversing the direction of rotation of said shaft to reciprocate said rack-bars, for the purpose specified.

6. In a transfer apparatus for batteries, the combination with a drawbridge for supporting batteries in transit to and from vehicles, of a lifting and lowering device therefor adapted to allow the free end of the bridge to come to rest at different elevations and consisting of an elbow-lever 39 41 engaging said drawbridge and the rod 42 for operating said lever.

7. In a transfer apparatus for batteries, the combination with a drawbridge for supporting batteries in transit to and from vehicles, of supplemental drawbridges attached to the vehicles and adapted to overlap the drawbridge.

8. In a transfer apparatus for batteries, the combination with a drawbridge for supporting batteries in transit to and from vehicles, of an antifriction-roller on said bridge, and supplemental drawbridges attached to the vehicle and made to overlap the drawbridge and span said roller.

9. The combination with a battery-tray provided with lugs or ears at its ends, of a pair of reciprocating rods provided with hooks for engaging said ears for withdrawing the tray, and a buffer or bar connecting said rods and serving to engage the tray in pushing it forward.

10. In a battery transfer system for vehicles, the combination with a battery-carrier, of a vehicle provided with space for holding a motive battery, and means along the line of way and independent of the battery-carrier for automatically stopping the vehicle to bring the battery-space thereof to a predetermined point or position with respect to the said battery-carrier for the purpose set forth.

11. In a battery transfer system for vehicles, the combination with a battery-carrier, of a vehicle provided with space for holding a motive battery, of a depression in the track traversed by the vehicle into which one or more of the vehicle-wheels may gravitate to bring the battery-space of the vehicle into alinement with the battery-carrier.

12. In a battery transfer apparatus for vehicles, the combination with a transfer mechanism having horizontally-reciprocating rods mounted in a fixed position and adapted to engage the batteries for moving them onto and off from the vehicle, and a battery-carrier adapted to bring the batteries into transfer position with relation to the transfer mechanism and the vehicle.

13. In a battery transfer apparatus for vehicles, the combination with a transfer mechanism consisting of a set of power-driven reciprocating rods adapted to engage the batteries for moving them onto and off from the vehicle, and a battery-carrier having a series of shelves either of which may be brought into transfer position with relation to the transfer mechanism and the vehicle.

14. In a battery transfer apparatus for vehicles, the combination with a transfer mechanism consisting of horizontally-mounted rods provided with hooks at their ends adapted to engage the batteries for moving them onto and off from the vehicle and propelling means for reciprocating said rods and a battery-carrier and means for moving the same into and out of the transfer position between the transfer mechanism and the vehicle.

15. In a battery transfer apparatus for vehicles, the combination with a transfer mechanism adapted to engage the batteries for moving them onto and off from the vehicle and a battery-carrier adapted to be brought into transfer position between the vehicle and the transfer mechanism, said transfer mechanism being power-driven and having horizontally-reciprocating rods provided with hooks at their ends and adapted to pass through the battery-carrier in transferring batteries.

16. In a battery transfer system, the combination with a battery-carrier adapted to bring a battery into position opposite the battery-receiving space of a vehicle, of a power-operated transfer mechanism mounted on a suitable fixed support on the side of the battery-carrier opposite to that occupied by the vehicle.

17. The combination with the battery-carrier consisting of an elevator-cage provided with a number of vertically-arranged shelves or supports, of battery transfer mechanism having horizontally-reciprocating rods mounted at the side of the elevator-shaft and adapted to pass through the cage and to engage with the batteries to shift them to and from the elevator.

18. The combination with the battery-carrier consisting of an elevator-cage provided with a number of vertically-arranged shelves or supports, of battery transfer mechanism mounted on a pillar or support at the side of the elevator-well opposite that occupied by the vehicle whose batteries are to be changed and adapted to engage with the batteries to shift them.

19. The combination with the battery-carrier consisting of an elevator-cage provided with a number of vertically-arranged shelves or supports, a bridge at the inside of the elevator-well, and battery transfer mechanism mounted in line therewith at the outside of the well and adapted to shift the batteries between the vehicle and the carrier.

20. In an apparatus for substituting one battery for another upon a vehicle, the combination of a transfer battery-carrier having two or more battery-supporting shelves or sections and adapted to change its position to allow a battery to be withdrawn from the vehicle onto one of the shelves or sections and another battery to be shifted from another shelf or section to replace the one removed from the vehicle and horizontally-reciprocating rods mounted at the side of the path of the battery-carrier and adapted to shift the batteries to or from any shelf or section of said carrier.

21. In a battery transfer apparatus, a reciprocating clutch or hook mounted on a suitable bar or support and adapted to take hold of the battery, a power device for operating the bar or support and mechanism for reversing the motion of said bar or support said bar and the power device for operating it being mounted on a fixed support at the side of the position occupied by the vehicle to be supplied with batteries substantially as set forth.

22. The combination with a battery to be transferred of a reciprocatory hook-carrying bar or support and power mechanism for operating the same, and manually-operated devices mounted on the support causing the hook or clutch to engage with and be disengaged from the battery all mounted on a fixed support at the side of the position occupied by the vehicle when a shift of batteries is made.

23. The combination in a battery transfer system, of suitable mechanism for shifting the batteries horizontally mounted upon a suitable pillar or support in fixed relation to the way or space into which the vehicle is run when its batteries are to be changed, and a battery-carrier arranged as described to permit the batteries to be brought into line with the transfer mechanism and said vehicle.

24. The combination in the battery transfer system, of suitable mechanism for shifting the batteries horizontally mounted upon a suitable pillar or support in fixed relation to the way or space into which the vehicle is run when its batteries are to be changed, and a battery-carrier arranged as described to permit the batteries to be brought into line between the transfer mechanism and the vehicle substantially as set forth.

25. In a battery transfer system, the combination with a vehicle provided with battery-space, of a set of transfer mechanism mounted on a support at each side of the vehicle and means whereby both sets of transfer mechanism may be operated simultaneously to shift batteries to and from the vehicle.

26. In a battery transfer system, the combination with a vehicle provided with battery-space, of a set of transfer mechanism mounted on a support at each side of the vehicle, drawbridges also mounted at each side of the vehicle and means for moving them to and from the vehicle and operable from the position whence the transfer mechanism is controlled.

Signed at New York, in the county of New York and State of New York, this 28th day of December, A. D. 1899.

CYPRIEN O. MAILLOUX.

Witnesses:
 DELBERT H. DECKER,
 ETHEL LOUISE LAWLER.